United States Patent
Ma et al.

(10) Patent No.: US 10,205,312 B2
(45) Date of Patent: Feb. 12, 2019

(54) POWER TRANSMISSION TOWER

(71) Applicant: JIANGSU SHENMA ELECTRIC CO., LTD., Nantong (CN)

(72) Inventors: Bin Ma, Nantong (CN); Jie Yu, Nantong (CN); Yong Qiu, Nantong (CN)

(73) Assignee: JIANGSU SHENMA ELECTRIC CO., LTD., Nantong (CN)

( * ) Notice: Subject to any disclaimer, the term of this patent is extended or adjusted under 35 U.S.C. 154(b) by 0 days.

(21) Appl. No.: 15/507,093

(22) PCT Filed: Aug. 31, 2015

(86) PCT No.: PCT/CN2015/088610
§ 371 (c)(1),
(2) Date: Feb. 27, 2017

(87) PCT Pub. No.: WO2016/034093
PCT Pub. Date: Mar. 10, 2016

(65) Prior Publication Data
US 2017/0279259 A1    Sep. 28, 2017

(30) Foreign Application Priority Data

Sep. 1, 2014  (CN) .......................... 2014 1 0441344

(51) Int. Cl.
*H02G 7/20*  (2006.01)
*E04H 12/10*  (2006.01)
(Continued)

(52) U.S. Cl.
CPC .............. *H02G 7/20* (2013.01); *E04H 12/10* (2013.01); *E04H 12/24* (2013.01); *E04H 12/34* (2013.01);
(Continued)

(58) Field of Classification Search
CPC .......... H02G 7/20; E04H 12/00; E04H 12/10; E04H 12/24; E04H 12/34; E04H 12/085; H01Q 1/1207; H01Q 1/1242
See application file for complete search history.

(56) References Cited

U.S. PATENT DOCUMENTS 2,143,612 A *  1/1939  Obbard .................... H02G 7/20
                                                    174/45 R
3,342,925 A     9/1967  Lewis et al.
(Continued)

FOREIGN PATENT DOCUMENTS

CN    202899719       4/2013
CN    103452370 A    12/2013
(Continued)

OTHER PUBLICATIONS

International Search Report and Written Opinion and English Translation thereof for International Application No. PCT/CN2015/088610, dated Dec. 3, 2015 (16 pages).
(Continued)

*Primary Examiner* — Adriana Figueroa
*Assistant Examiner* — Jessie T Fonseca
(74) *Attorney, Agent, or Firm* — Kagan Binder, PLLC

(57) ABSTRACT

A power transmission tower comprises a tower body (100) longitudinally arranged and cross arms (120) transversely arranged on the tower body. The tower body (100) is provided with a first transverse direction (Y) and a second transverse direction (X), which are perpendicular to each other, in the horizontal direction. A supporting piece (110), which extends outwards from the tower body (100) in the first transverse direction (Y), is arranged on the power transmission tower. One end of the supporting piece (110) is fixed to the tower body (100) and the other end of the supporting piece (110) is a free end (111, 112). The cross arms (120) extend in the second transverse direction (X).
(Continued)

One end of each cross arm (120) is connected to the free end (111, 112) and the other end of each cross arm (120) is used for arranging overhead wires. The power transmission tower reduces corridor width and occupies less area.

16 Claims, 4 Drawing Sheets

(51) Int. Cl.
  *E04H 12/24* (2006.01)
  *E04H 12/34* (2006.01)
  *H01Q 1/12* (2006.01)
(52) U.S. Cl.
  CPC ......... *H01Q 1/1207* (2013.01); *H01Q 1/1242* (2013.01)

(56) References Cited

U.S. PATENT DOCUMENTS

| | | | | | |
|---|---|---|---|---|---|
| 3,482,031 | A * | 12/1969 | Rutenberg | ............... | H02G 7/20 174/148 |
| 3,519,727 | A * | 7/1970 | Johns | ................ | H02G 7/20 174/45 R |
| 3,647,933 | A * | 3/1972 | Okada | ................ | H02G 7/20 174/148 |
| 3,671,002 | A * | 6/1972 | Elliott | ................ | H02G 7/20 174/158 R |
| 4,018,980 | A * | 4/1977 | Mohajery | ................ | H02G 7/14 174/42 |
| 4,679,672 | A * | 7/1987 | Seddon | ................ | B60M 1/20 174/45 R |
| 5,649,402 | A * | 7/1997 | Moore | ................ | E04H 12/10 343/890 |
| 5,777,262 | A * | 7/1998 | Nourai | ................ | H02G 7/20 174/40 R |
| 5,920,291 | A * | 7/1999 | Bosley | ................ | H01Q 1/1207 343/879 |
| 9,698,585 | B2 * | 7/2017 | Ma | ................ | H02G 7/05 |
| 2004/0211149 | A1 * | 10/2004 | Rioux | ................ | E04H 12/08 52/848 |
| 2010/0064598 | A1 * | 3/2010 | Lee | ................ | H02G 7/20 52/40 |
| 2012/0205139 | A1 | 8/2012 | Cotton et al. | | |
| 2015/0295392 | A1 * | 10/2015 | Ma | ................ | E04H 12/02 174/45 R |

FOREIGN PATENT DOCUMENTS

| | | |
|---|---|---|
| CN | 104196303 A | 12/2014 |
| CN | 204126357 U | 1/2015 |
| JP | 1994-276654 A | 9/1994 |
| JP | 06276654 A * | 9/1994 |
| RU | 95173 | 6/2010 |
| SU | 12133 | 12/1929 |
| SU | 12137 | 12/1929 |
| SU | 218400 | 5/1968 |

OTHER PUBLICATIONS

Search Report & First Office Action and English Translation thereof for Priority Chinese Patent Application No. 201410441344.6, dated Mar. 4, 2016.
Second Office Action and English Translation thereof for Priority Chinese Patent Application No. 201410441344.6, dated Oct. 21, 2016.
Third Office Action and English Translation thereof for Priority Chinese Patent Application No. 201410441344.6, dated Mar. 22, 2017.
Fourth Office Action and English Translation thereof for Priority Chinese Patent Application No. 201410441344.6, dated Aug. 3, 2017.
Office Action for counterpart Canadian Patent Application No. 2,959,558 dated Nov. 2, 2017.
Office Action for counterpart Australian Patent Application No. 2015311408 dated Nov. 7, 2017.
First Office Action (Notice of Grounds for Rejection) and English machine translation thereof for parallel Japanese Patent Application No. 2017-512021, dated Feb. 27, 2018, (7 pages).
The extended European Search Report for parallel European Patent Application No. 15837486.8, dated Apr. 24, 2018, (8 pages).
Office Action and brief translation thereof for parallel Russian Patent Application No. 2017110402, dated May 10, 2018, (8 pages).

\* cited by examiner

POWER TRANSMISSION TOWER

FIELD

The present disclosure relates generally to the field of power transmission equipment, and more particularly, to a power transmission tower.

BACKGROUND

The power transmission tower is an important supporting structural member in a power transmission line, and its configuration and material will directly affect construction speed, economical efficiency, and reliability of the power transmission line, and other aspects, such as installation, maintenance and repair. The tower widely used in overhead power transmission lines at present, both in China and abroad, includes wooden pole, concrete pole and iron tower, in which the iron tower is the most common tower used in high voltage and ultra-high voltage power transmission lines in nations around the world.

On the other hand, with the erection of power transmission lines, a large number of cultivated lands are occupied, resulting in the waste of land resources, and the great increase in erection cost of power transmission lines.

SUMMARY

In light of the obvious defect in the prior art, an objective of the present disclosure is to provide a power transmission tower, which occupies less area.

In order to achieve the above objective, a power transmission tower is provided, including a tower body longitudinally arranged and cross arms transversely arranged on the tower body, wherein a first transverse direction and a second transverse direction, which are perpendicular to each other, are provided in the horizontal direction, the power transmission tower is provided with a supporting member extending outwards from the tower body in the first transverse direction, one end of the supporting member being fixed to the tower body, the other end of the supporting member being a free end, and the cross arms extend in the second transverse direction, with one end of each cross arm connected to the free end, and the other end of each cross arm for arranging overhead wires.

In the above power transmission tower, the supporting member is arranged in the first transverse direction, and the supporting member is connected to the above cross arms. Compared with the traditional means by which the cross arms are connected to the tower body directly, the end of each cross arm according to the present disclosure can become closer to the tower body after the cross arm has been adjusted to have an appropriate angle at installation time, while satisfying the requirement of air gap. Thus the power transmission tower according to the present disclosure can reduce line corridor width and occupy less area.

Preferably, the power transmission tower is provided with two supporting members symmetrical to each other, extending outwards from the tower body in the first transverse direction, one end of each supporting member being fixed to the tower body, the other ends of the supporting members including a first free end and a second free end, the first free end is connected to one end of a first cross arm, the second free end is connected to one end of a second cross arm, and the other end of the first cross arm and the other end of the second cross arm are connected to each other.

More preferably, ends of the first cross arm and the second cross arm are fixed to each other directly.

More preferably, the first cross arm has a same length as the second cross arm. Such symmetrical structure makes the power transmission tower bear averaged force.

More preferably, the tower body is of an architectural type, and the supporting member has a triangular structure. The supporting member with the triangular structure can allow the supporting member to have better stability, and can lower the cost by reducing materials on the base of improving the stability.

More preferably, the tower body is of a single column type, and the supporting member has a column shape.

Preferably, only one supporting member is provided, a first cross arm is connected to the free end, a second cross arm is arranged on the tower body, and ends of the first cross arm and the second cross arm are connected to each other.

Preferably, the power transmission tower further includes a first oblique-pulling member, one end of the first oblique-pulling member is fixed above a place where the supporting member is fixed to the tower body, and the other end of the first oblique-pulling member is fixed to the free end.

Preferably, the power transmission tower further includes a second oblique-pulling member, one end of the second oblique-pulling member is fixed above a place where the cross arm is fixed to the tower body, and the other end of the second oblique-pulling member is fixed to the end of the cross arm.

The power transmission tower according to the present disclosure uses a supporting member to connect the cross arm, and it thus reduces line corridor width and occupies less area.

DETAILED DESCRIPTION 1000, 2000, 3000, 4000: power transmission tower;
100, 200, 300, 400: tower body;
110, 210, 410: supporting member;
111: first free end;
112: second free end;
120, 420: cross arm;
121, 221, 321: first cross arm;
122, 222, 322: second cross arm;
223: connecting rod;
131, 231: first oblique-pulling member;
132, 332, 432: second oblique-pulling member;
Y: first transverse direction; and
X: second transverse direction.

DETAILED DESCRIPTION

In the following description of embodiments, reference is made to the accompanying drawings which form a part hereof, and in which it is shown by way of illustration specific embodiments of the invention that can be practiced. It is to be understood that other embodiments can be used and structural changes can be made without departing from the scope of the disclosed embodiments.

First Embodiment

Figure 1:
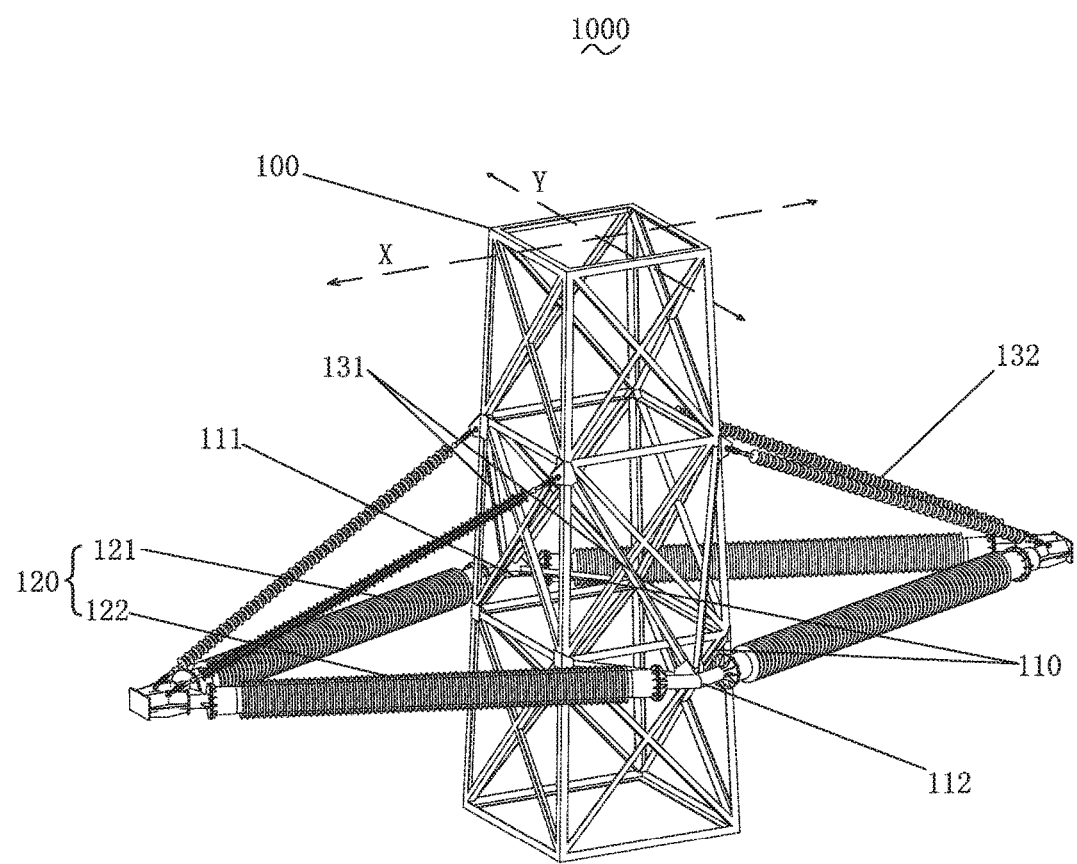
FIG. 1 is a structural schematic diagram illuminating a part of a power transmission tower, in accordance with a first embodiment of the present invention.

As shown in FIG. 1, the power transmission tower 1000 according to the first embodiment of the present disclosure includes a tower body 100, two supporting members 100 mounted on the tower body 100, and cross arms 120 mounted on the supporting member 110.

The tower body 100 is in a steel structure of lattice type. The tower body 100 has four side surfaces, and each side surface is in a shape of an isosceles trapezoid of small top and large bottom. The tower body 100 is provided with a first transverse direction Y and a second transverse direction X, which are perpendicular to each other, in the horizontal direction.

One end of the supporting member 110 is fixed to the tower body 100, and the other end of the supporting member 110 extends outwards in the first transverse direction Y. Ends of the two supporting members 110 away from the tower body 100 are a first free end 111 and a second free end 112 respectively. Four first oblique-pulling members 131 are arranged between the tower body 100 and the supporting members 110. One end of each first oblique-pulling member 131 is fixed above a place where the supporting member 110 is fixed to the tower body 100, and each two of other ends of the first oblique-pulling members 131 are fixed to the first free end 111 and the second free end 112 respectively. Both of the supporting member 110 and the first oblique-pulling member 131 are made of a metal material. The supporting member 119 has a triangular structure, which is more stable in structure.

The cross arms 120 include a first cross arm 121 and a second cross arm 122. One end of the first cross arm 121 is connected to the first free end 111, one end of the second cross arm 122 is connected to the second free end 112, and the respective other ends of the first cross arm 121 and the second cross arm 122 are connected to each other. Both of the first cross arm 121 and the second cross arm 122 extend outwards from the tower body 100 in the second transverse direction X. The first cross arm 121 has a same length as the second cross arm 122. In this embodiment, the power transmission tower 1000 includes two sets of the first cross arm 121 and the second cross arm 122. The two sets of cross arms are bilaterally symmetrical to the tower body 100. A second oblique-pulling member 132 is arranged between the tower body 100 and the cross arm 120. One end of the second oblique-pulling member 132 is fixed to the tower body 100 above a plane where the cross arm 120 is, and the other end of the second oblique-pulling member 132 is fixed to the end of the cross arm. In this embodiment, there are four second oblique-pulling members 132. Both of the cross arm 120 and the second oblique-pulling member 132 are made of a composite material.

In the power transmission tower 1000 of this embodiment, the supporting member 110 is arranged to be connected to the cross arms 120, so compared with the traditional means by which the cross arms are connected to the tower body directly, the angle between the first cross arm 121 and the second cross arm 122 can be increased by the configuration of the supporting member 110. In this way, the distance from the end of the cross arm 120 to the tower body 100 can be reduced to the minimum necessary to satisfy the requirement of air insulation space, while the cross arm 120 staying the same length, and the power transmission tower 1000 thus reduces line corridor width and occupies less area.

Second Embodiment

Figure 2:
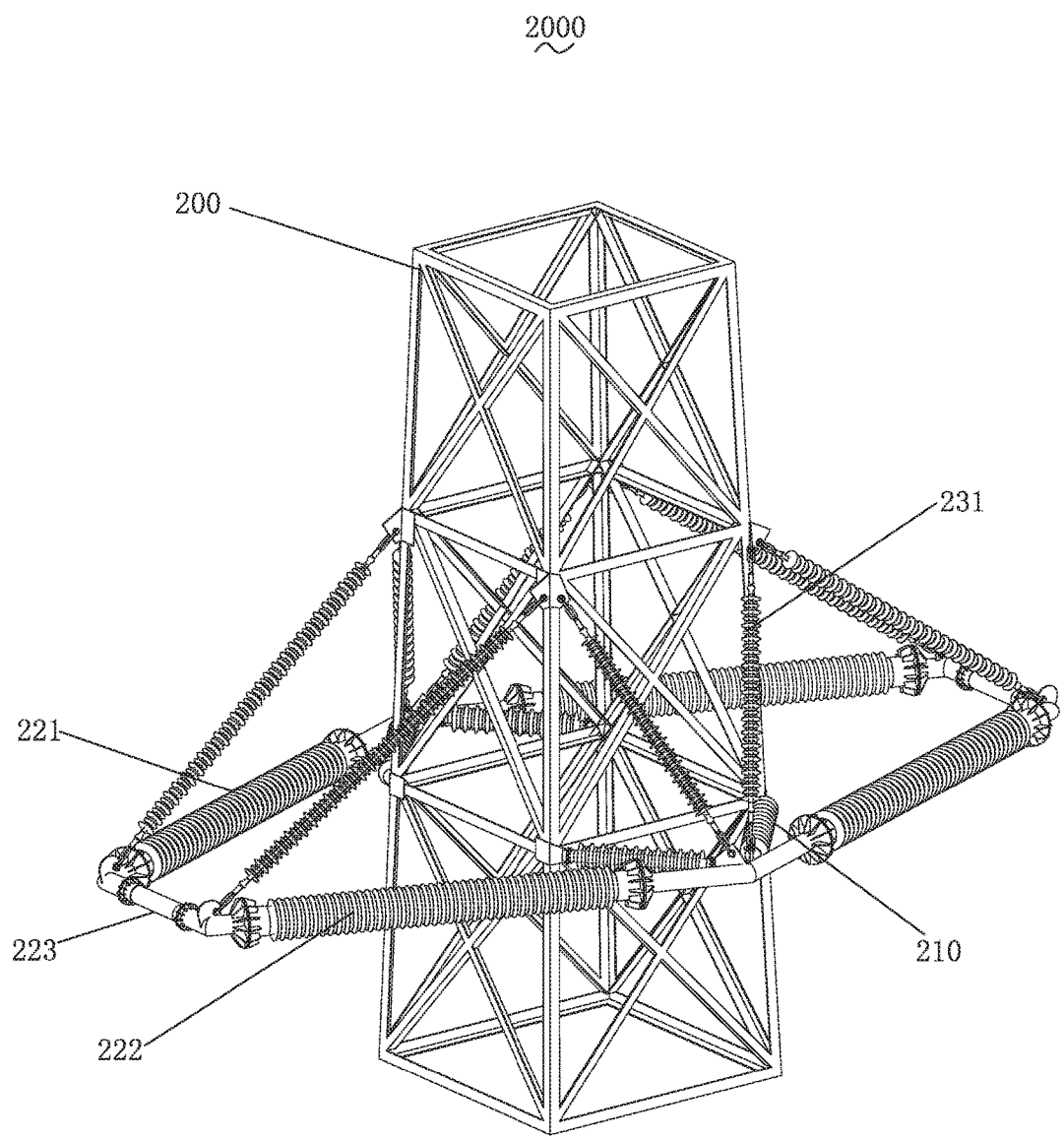
FIG. 2 is a structural schematic diagram illuminating a part of a power transmission tower, in accordance with a second embodiment of the present invention.

As shown in FIG. 2, for the power transmission tower 2000 of the second embodiment, the supporting member 210 and the first oblique-pulling member 231 are made of a composite material, and their shapes are substantially the same as those of the supporting member 110 and the first oblique-pulling member 131 of the first embodiment respectively. This embodiment is different from the first embodiment in that ends of the first cross arm 221 and the second cross arm 222 are not fixed together directly, but through a connecting rod 223. The connecting rod 223 is made of a metal material.

Other configurations of this embodiment are the same as the first embodiment.

The power transmission tower 2000 of this embodiment has all advantages of the power transmission tower 1000 of the first embodiment. In addition, the supporting member 210 and the first oblique-pulling member 231 in this embodiment are made of an insulating material, so each of the first cross arm 221 and the second cross arm 222 can have a shorter length; and ends of the first cross arm 221 and the second cross arm 222 are fixed together trough the connecting rod 223, so the angle between the first cross arm 221 and the second cross arm 222 is adjustable, and the distance from each of ends of the first cross arm 221 and the second cross arm 222 to the tower body 200 can be adjusted to be as a shortest insulating distance.

Third Embodiment

Figure 3:
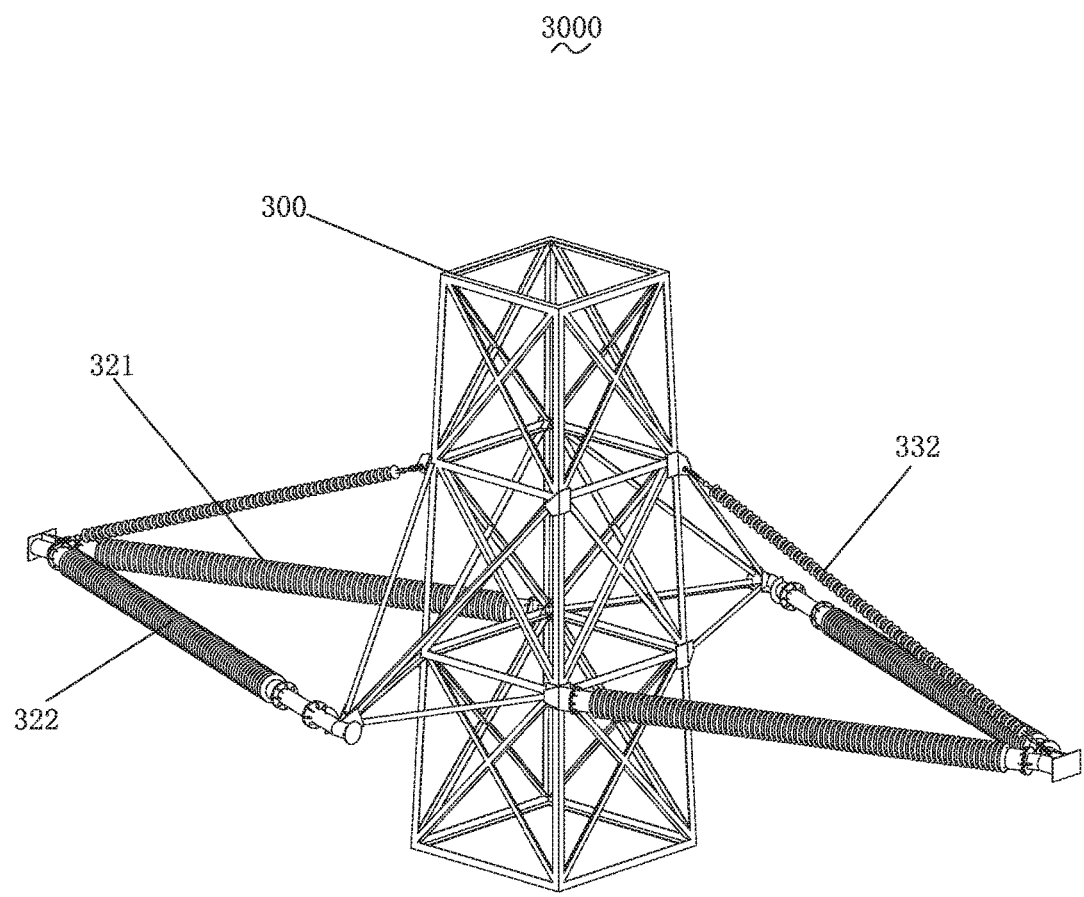
FIG. 3 is a structural schematic diagram illuminating a part of a power transmission tower, in accordance with a third embodiment of the present invention.

As shown in FIG. 3, for the transmission tower 3000 of this embodiment, the first cross arm 321 on the left of the tower body 300 is fixed to the tower body 300 directly, and the second cross arm 322 on the right of the tower body 300 is fixed to the tower body 300 directly. In this embodiment, there are only two second oblique-pulling members 332, one is on the left of the tower body 300, and the other is on the right of the tower body 300. Other configurations of this embodiment are the same as the first embodiment.

The transmission tower 3000 of this embodiment has all advantages of the first embodiment.

Fourth Embodiment

Figure 4:
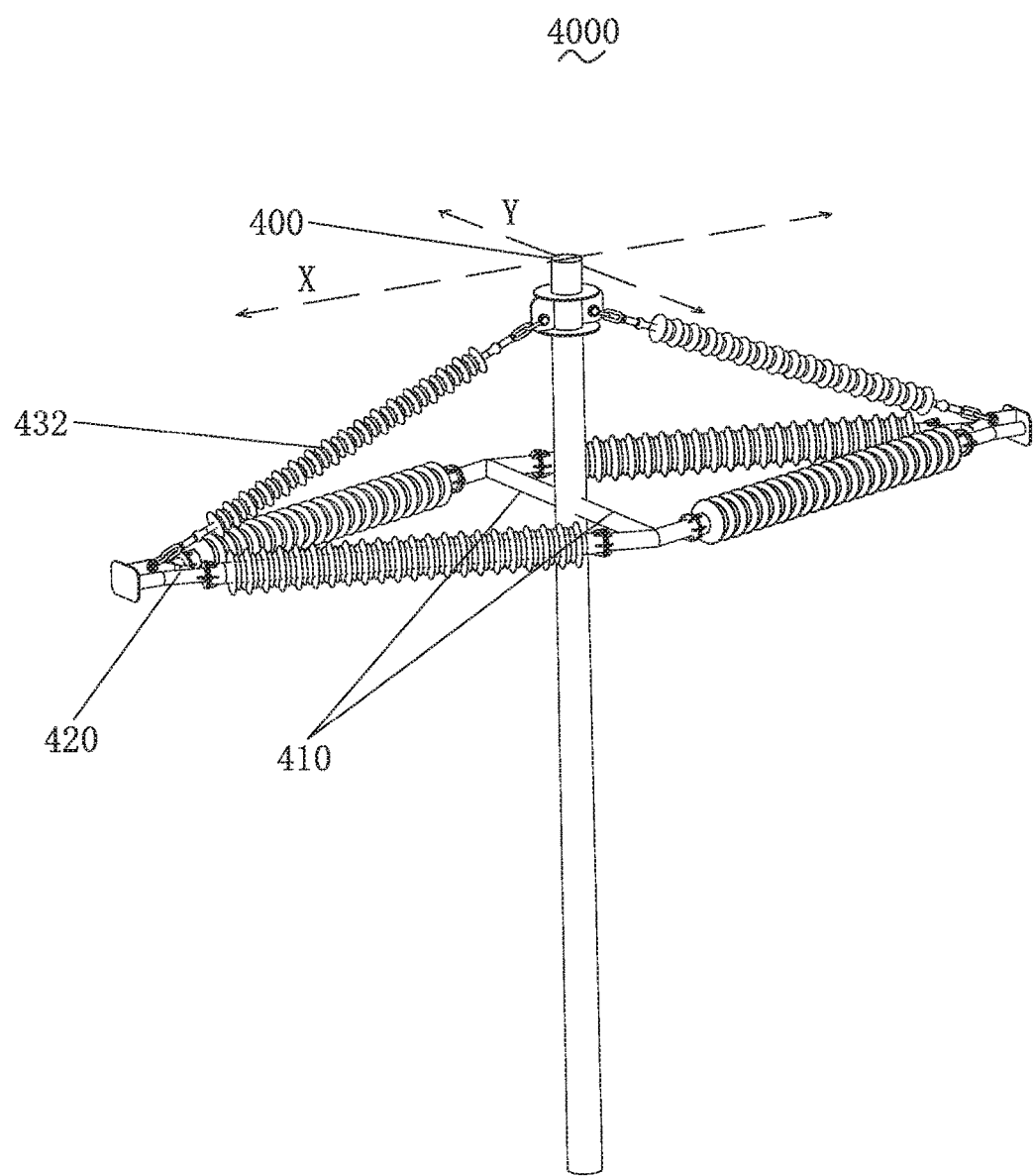
FIG. 4 is a structural schematic diagram illuminating a part of a power transmission tower, in accordance with a fourth embodiment of the present invention.

As shown in FIG. 4, the power transmission tower 4000 of this embodiment includes a tower body 400, two supporting members 410 mounted on the tower body 400, cross arms 420 mounted on the supporting members 410, and a second oblique-pulling member 432 arranged between the tower body 400 and the cross arm 420.

The tower body 400 has a cylindrical structure. The tower body 400 is provided with a first transverse direction Y and a second transverse direction X, which are perpendicular to each other, in the horizontal direction.

The supporting member 410 has a rod-shaped structure. One end of the supporting member 410 is fixed to the tower body 400, and the other end of the supporting member 410 extends outwards in the first transverse direction Y.

The cross arm 420 and the second oblique-pulling member 432 have substantially the same structures as the cross arm and the second oblique-pulling member 332 of the third embodiment respectively.

The power transmission tower 4000 of this embodiment is generally used for a power transmission tower of low voltage level, and has all advantages of the first embodiment.

The foregoing descriptions of embodiments of the present disclosure have been presented only for purposes of illustration and description. They are not intended to be exhaustive or to limit this disclosure. Accordingly, many modifications and variations will be apparent to practitioners skilled in the art to which the present disclosure pertains without departing from its scope. Accordingly, the scope of the present disclosure is defined by the appended claims rather than the foregoing description and the exemplary embodiments described therein.

The invention claimed is:

1. A power transmission tower, comprising a tower body longitudinally arranged and a first cross arm and a second cross arm transversely arranged on the tower body, wherein a first transverse direction and a second transverse direction, which are perpendicular to each other, are provided in the horizontal direction, the power transmission tower is provided with a first elongated, supporting member extending outwards from a first side of the tower body in the first transverse direction, one end of the first elongated, supporting member being fixed to the tower body, the other end of the first elongated, supporting member being a free end, a second elongated, supporting member extending outwards from a second side of the tower body in the first transverse direction, one end of the second elongated, supporting member being fixed to the tower body, the other end of the second elongated, supporting member being a free end, a third elongated, supporting member extending outwards from the first side of the tower body in the first transverse direction, one end of the third elongated, supporting member being fixed to the tower body, the other end of the third elongated, supporting member being a free end, and a fourth elongated, supporting member extending outwards from the second side of the tower body in the first transverse direction, one end of the fourth elongated, supporting member being fixed to the tower body, the other end of the fourth elongated, supporting member being a free end, wherein the first and second cross arms extend in the second transverse direction, wherein one end of the first cross arm is connected to the free end of the first elongated, supporting member on the first side of the tower body in first transverse direction, wherein the one end of the first cross arm is connected to the free end of the third elongated, supporting member on the first side of the tower body in first transverse direction, wherein one end of the second cross arm is connected to the free end of the second elongated, supporting member on the second side of the tower body in first transverse direction, wherein the one end of the second cross arm is connected to the free end of the fourth elongated, supporting member on the second side of the tower body in first transverse direction, wherein the one end of the second cross arm is positioned on the second side of the tower body in the first transverse direction that is opposite the first side of the tower body, wherein the other end of the first cross arm and the other end of the second cross arm are coupled together, and the other end of the first cross arm and the other end of the second cross arm for arranging overhead wires.

2. The power transmission tower of claim 1, wherein the first and second elongated, supporting members are symmetrical to each other.

3. The power transmission tower of claim 1, wherein the other end of the first cross arm and the other end of the second cross arm are fixed to each other directly.

4. The power transmission tower of claim 1, wherein the first cross arm has a same length as the second cross arm.

5. The power transmission tower of claim 1, wherein the tower body is of an architectural type.

6. The power transmission tower of claim 1, wherein the tower body is of a single column type.

7. The power transmission tower of claim 1, further comprising a first oblique-pulling member, one end of the first oblique-pulling member is connected above a place where the first elongated, supporting member is fixed to the tower body, and the other end of the first oblique-pulling member is fixed to the free end of the first elongated, supporting member.

8. The power transmission tower of claim 7, further comprising a second oblique-pulling member, one end of the second oblique-pulling member is connected above a place where the first elongated, supporting member is fixed to the tower body, and the other end of the second oblique-pulling member is fixed to the free end of the first elongated, supporting member.

9. The power transmission tower of claim 1, wherein the first elongated, supporting member is made of an insulating material.

10. The power transmission tower of claim 1, wherein the first elongated, supporting member and the third elongated, supporting member form a triangular structure, and wherein the second elongated, supporting member and the fourth elongated, supporting member form a triangular structure.

11. The power transmission tower of claim 1, wherein the first elongated, supporting member is a single structure parallel to the first transverse direction.

12. The power transmission tower of claim 1, further comprising a connecting member, wherein the other end of the first cross arm and the other end of the second cross arm are connected to each other through the connecting member.

13. The power transmission tower of claim 12, further comprising:
   a) a first oblique-pulling member, one end of the first oblique-pulling member is fixed above a place where the first cross arm is fixed to the tower body, and the other end of the first oblique-pulling member is fixed to the other end of the first cross arm; and
   b) a second oblique-pulling member, one end of the second oblique-pulling member is fixed above a place where the second cross arm is fixed to the tower body, and the other end of the second oblique-pulling member is fixed to the other end of the second cross arm.

14. A power transmission tower, comprising:
   a) a tower body longitudinally arranged, wherein a first transverse direction and a second transverse direction, which are perpendicular to each other, are provided in the horizontal direction;
   b) a first cross arm and a second cross arm transversely arranged on the tower body, the first and second cross arms extend in the second transverse direction; and
   c) a first elongated, supporting member extending outwards from a first side of the tower body in the first transverse direction, one end of the first elongated, supporting member being fixed to the tower body, the other end of the first elongated, supporting member being a free end, wherein one end of the first cross arm is connected to the free end of the first elongated, supporting member on the first side of the tower body in first transverse direction, wherein one end of the second cross arm is positioned on a second side of the tower body in the first transverse direction that is opposite the first side of the tower body, wherein the second cross arm is fixed directly to the tower body, wherein the other end of the first cross arm and the other end of the second cross arm are coupled together, and the other end of the first cross arm and the other end of the second cross arm for arranging overhead wires.

15. The power transmission tower of claim 14, further comprising:
   a) a third cross arm and a fourth cross arm transversely arranged on a side of the tower body that is opposite the first and second cross arms, the third and fourth cross arms extend in the second transverse direction; and
   b) a second elongated, supporting member extending outwards from a second side of the tower body in the first transverse direction, one end of the second elongated, supporting member being fixed to the tower body, the other end of the second elongated, supporting member being a free end, wherein one end of the third cross arm is connected to the free end of the second elongated, supporting member on the second side of the tower body in first transverse direction, wherein one end of the fourth cross arm is positioned on the first side of the tower body in the first transverse direction, wherein the fourth cross arm is fixed directly to the tower body, wherein the other end of the third cross arm and the other end of the fourth cross arm are coupled together.

16. A power transmission tower, comprising a tower body longitudinally arranged and a first cross arm and a second cross arm transversely arranged on the tower body, wherein a first transverse direction and a second transverse direction, which are perpendicular to each other, are provided in the horizontal direction, the power transmission tower is provided with a first elongated, supporting member extending outwards from a first side of the tower body in the first transverse direction, one end of the first elongated, supporting member being fixed to the tower body, the other end of the first elongated, supporting member being a free end and a second elongated, supporting member extending outwards from a second side of the tower body in the first transverse direction, one end of the second elongated, supporting member being fixed to the tower body, the other end of the second elongated, supporting member being a free end, and the first and second cross arms extend in the second transverse direction, wherein one end of the first cross arm is connected to the free end of the first elongated, supporting member on the first side of the tower body in first transverse direction, wherein one end of the second cross arm is connected to the free end of the second elongated, supporting member on the second side of the tower body in first transverse direction, wherein the one end of the second cross arm is positioned on the second side of the tower body in the first transverse direction that is opposite the first side of the tower body, wherein the other end of the first cross arm and the other end of the second cross arm are coupled together, and the other end of the first cross arm and the other end of the second cross arm for arranging overhead wires, wherein the power transmission tower further comprises:
   a connecting member, wherein the other end of the first cross arm and the other end of the second cross arm are connected to each other through the connecting member;
   a first oblique-pulling member, one end of the first oblique-pulling member is fixed above a place where the first cross arm is fixed to the tower body, and the other end of the first oblique-pulling member is fixed to the other end of the first cross arm; and
   a second oblique-pulling member, one end of the second oblique-pulling member is fixed above a place where the second cross arm is fixed to the tower body, and the other end of the second oblique-pulling member is fixed to the other end of the second cross arm.

* * * * *